Nov. 26, 1963 J. M. MORRIS ETAL 3,112,000
APPARATUS FOR CONTINUOUSLY WEIGHING AGGREGATE
Filed Sept. 18, 1959 8 Sheets-Sheet 1
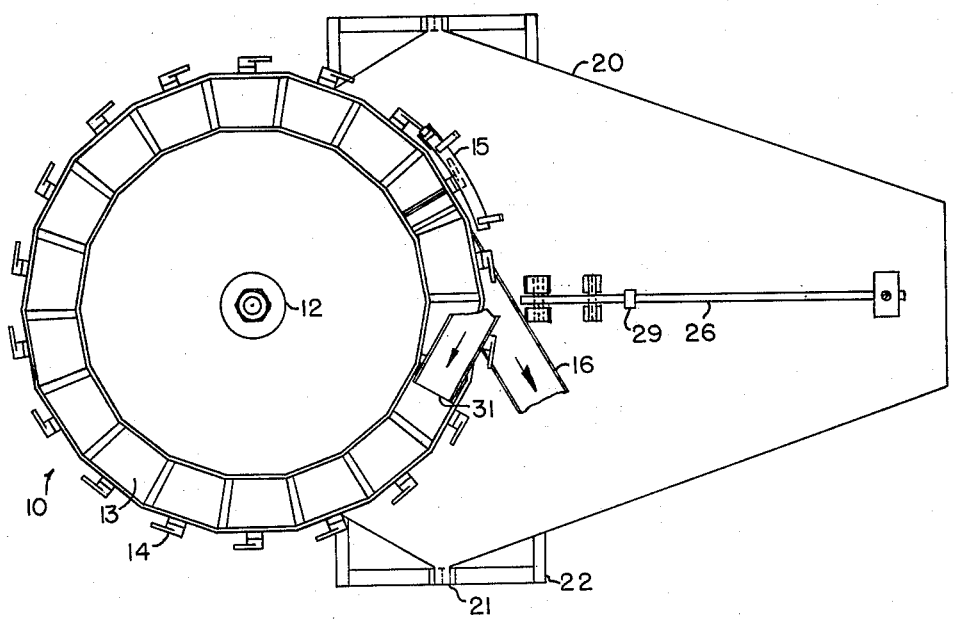
Fig. I
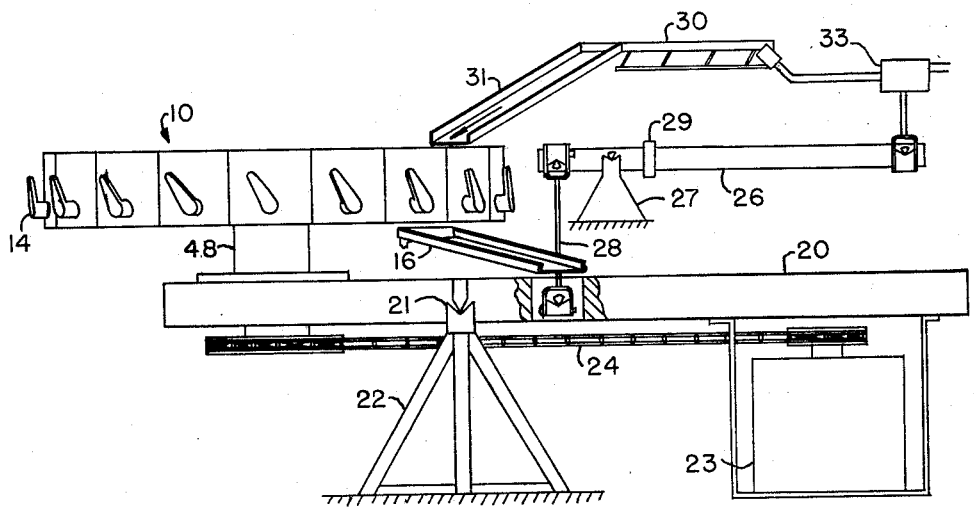
Fig. II
INVENTORS
ROBERT M. CARRIER, JR.
JOHN M. MORRIS
BY
Marshall, Marshall & Yeasting
ATTORNEYS Nov. 26, 1963　　　J. M. MORRIS ETAL　　　3,112,000
APPARATUS FOR CONTINUOUSLY WEIGHING AGGREGATE
Filed Sept. 18, 1959　　　　　　　　　　　　8 Sheets-Sheet 2
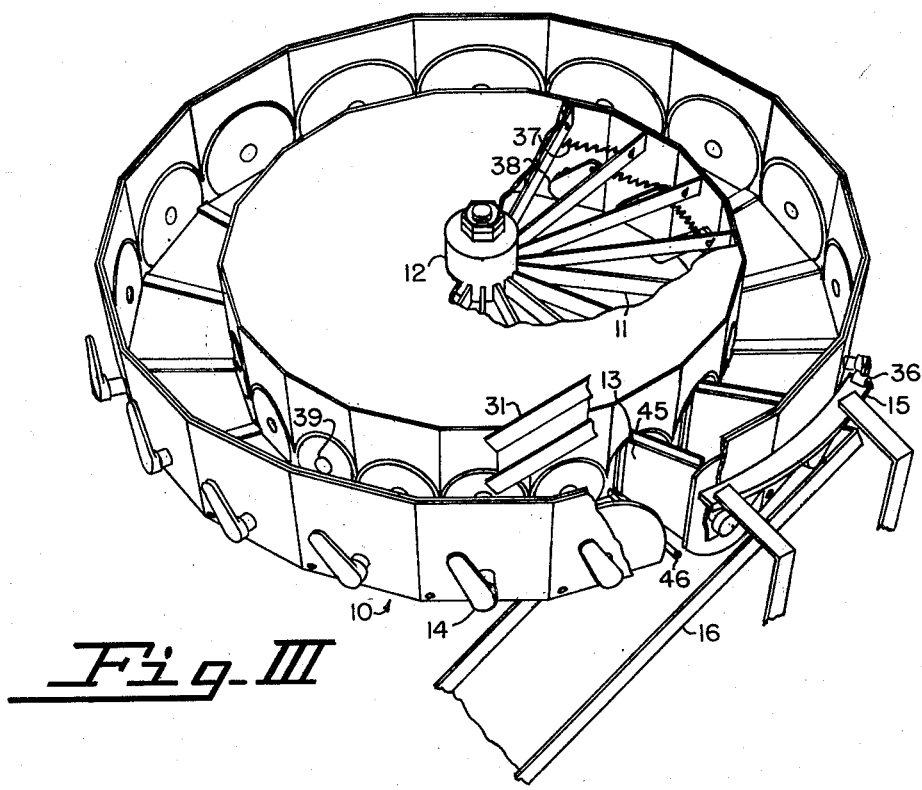
Fig. III
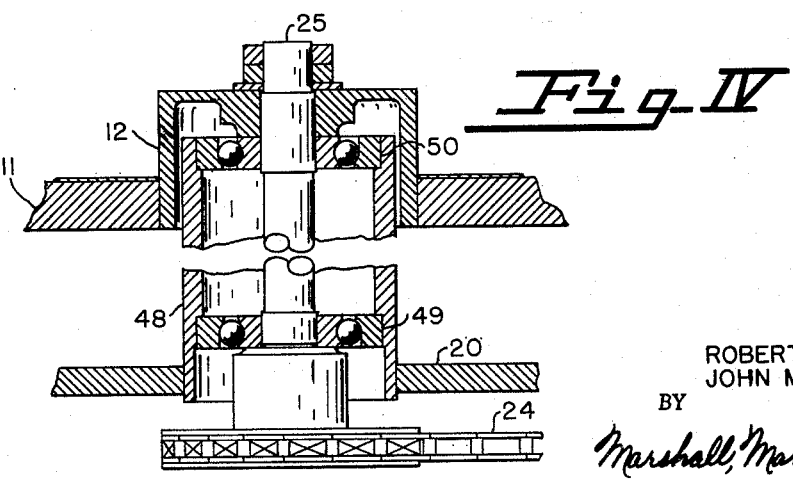
Fig. IV
INVENTORS
ROBERT M. CARRIER, JR.
JOHN M. MORRIS
BY
Marshall, Marshall & Yeasting
ATTORNEYS

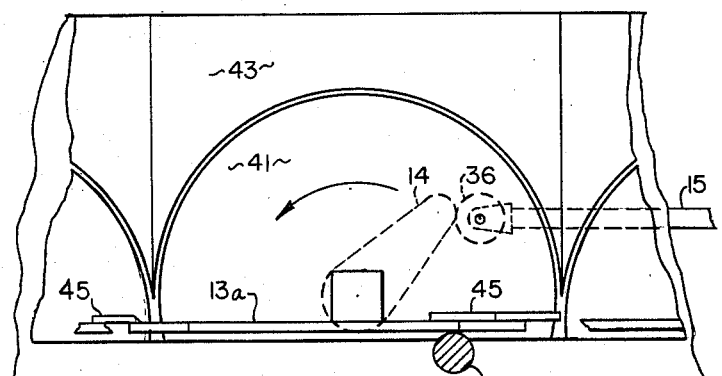
Fig. V
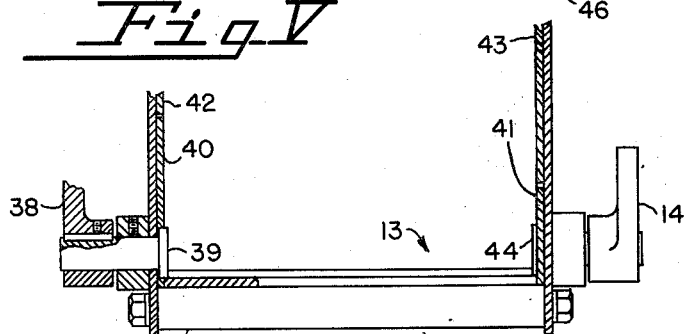
Fig. VI
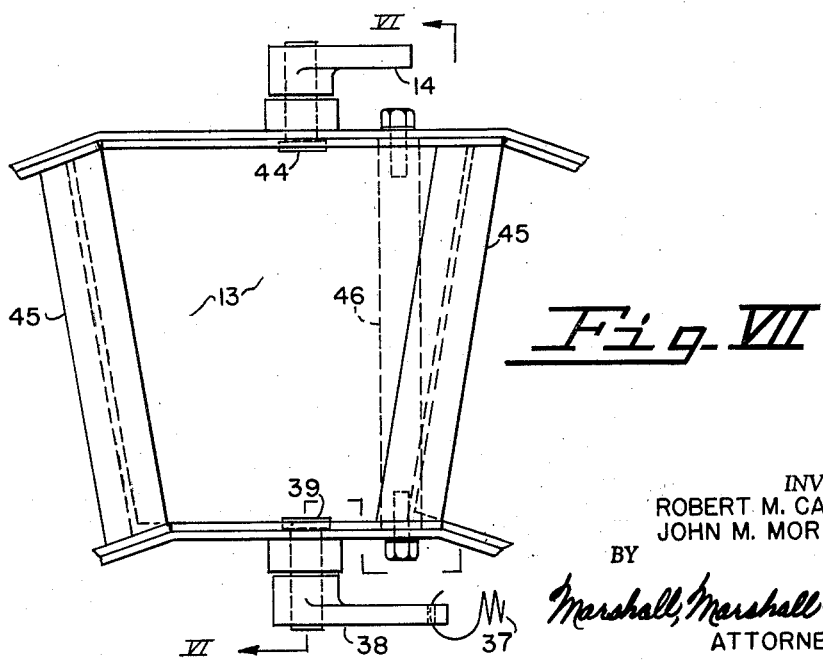
Fig. VII
INVENTORS
ROBERT M. CARRIER, JR.
JOHN M. MORRIS
BY
Marshall, Marshall + Yeasting
ATTORNEYS Nov. 26, 1963  J. M. MORRIS ETAL  3,112,000
APPARATUS FOR CONTINUOUSLY WEIGHING AGGREGATE
Filed Sept. 18, 1959  8 Sheets-Sheet 4
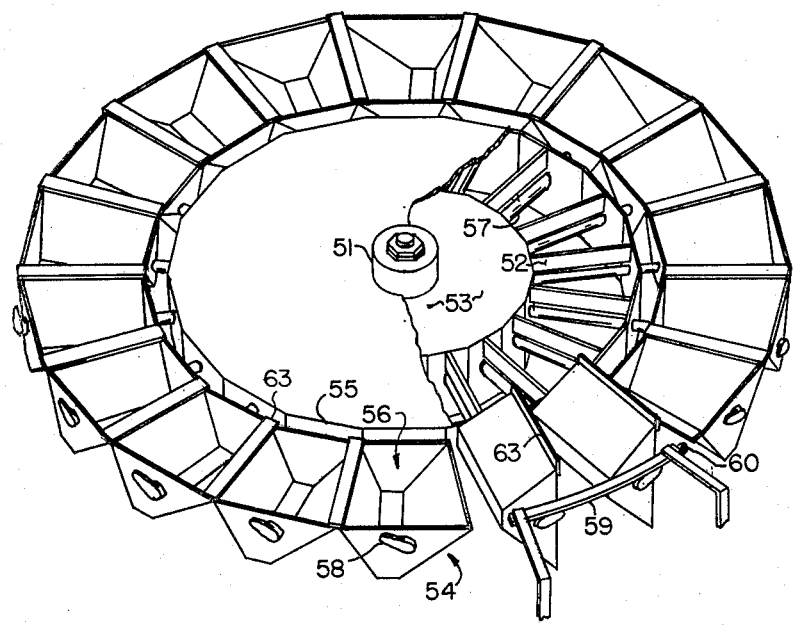
Fig. VIII
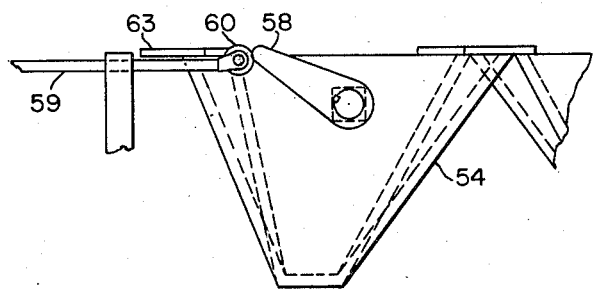
Fig. IX
INVENTORS
ROBERT M. CARRIER, JR.
JOHN M. MORRIS
BY
Marshall, Marshall & Yeasting
ATTORNEYS

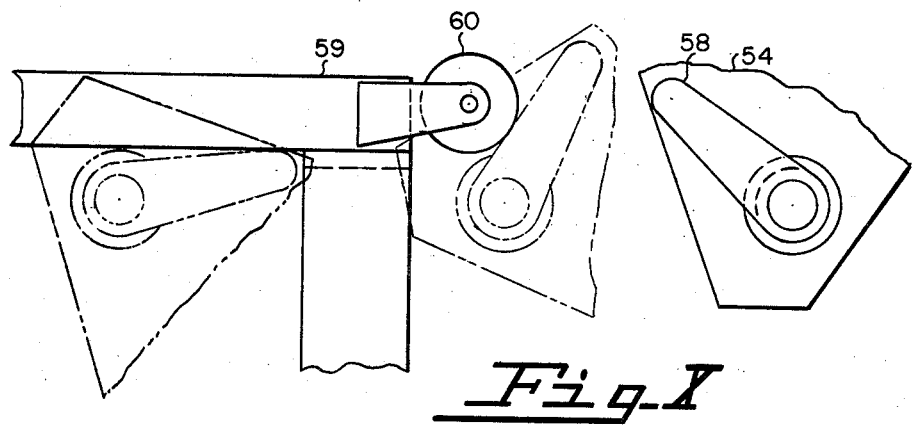
_Fig. I_
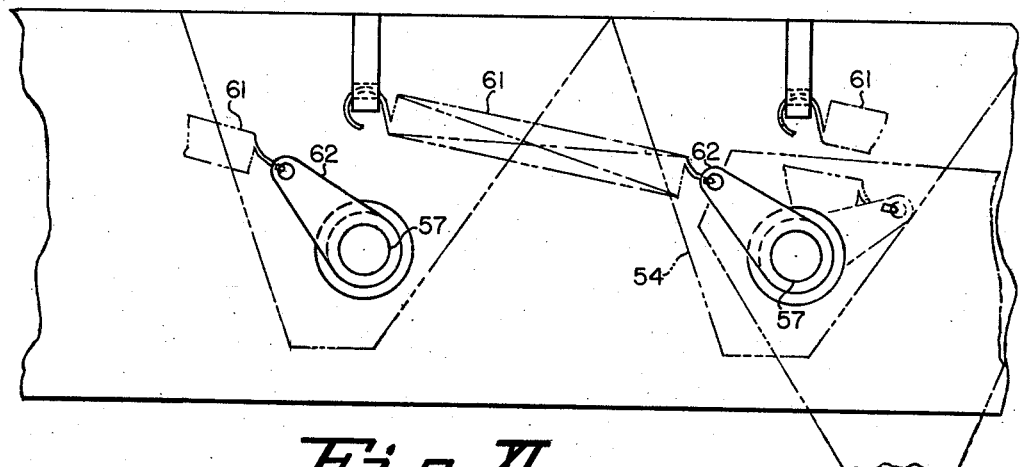
_Fig. II_
INVENTORS
ROBERT M. CARRIER, JR.
JOHN M. MORRIS

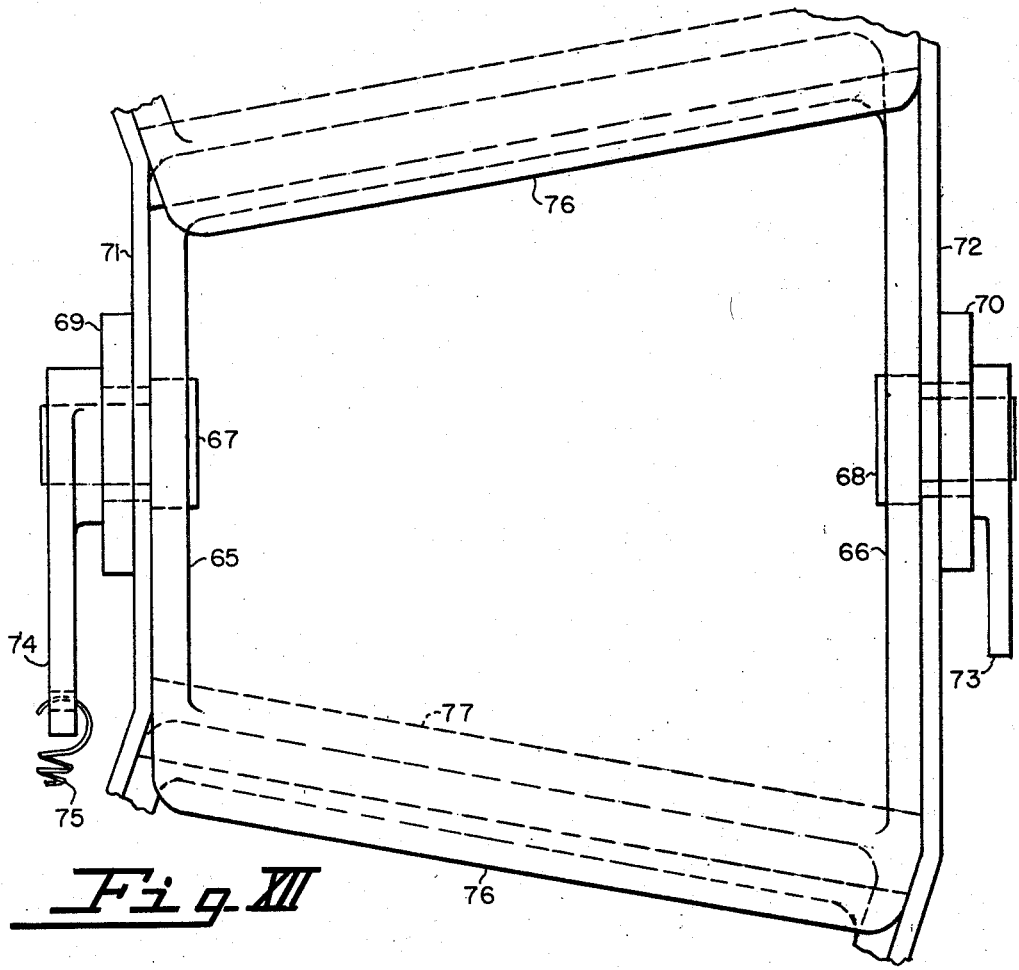
Fig. XII
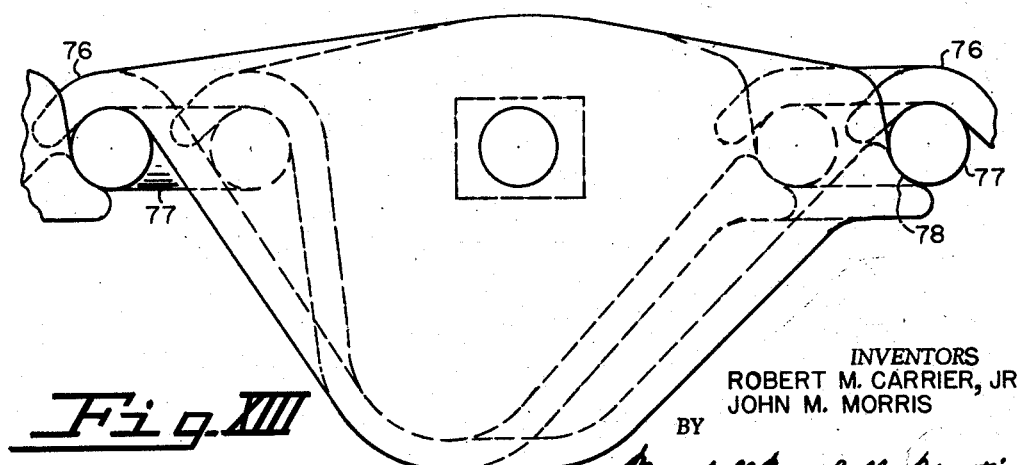
Fig. XIII
INVENTORS
ROBERT M. CARRIER, JR.
JOHN M. MORRIS Nov. 26, 1963  J. M. MORRIS ETAL  3,112,000
APPARATUS FOR CONTINUOUSLY WEIGHING AGGREGATE
Filed Sept. 18, 1959  8 Sheets-Sheet 7
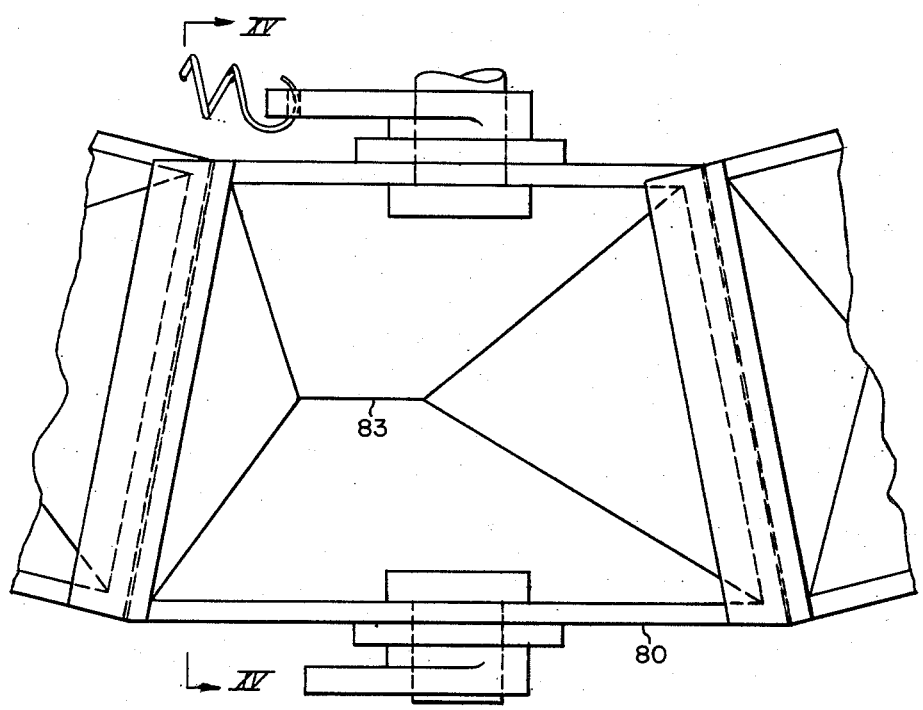
Fig. XIV
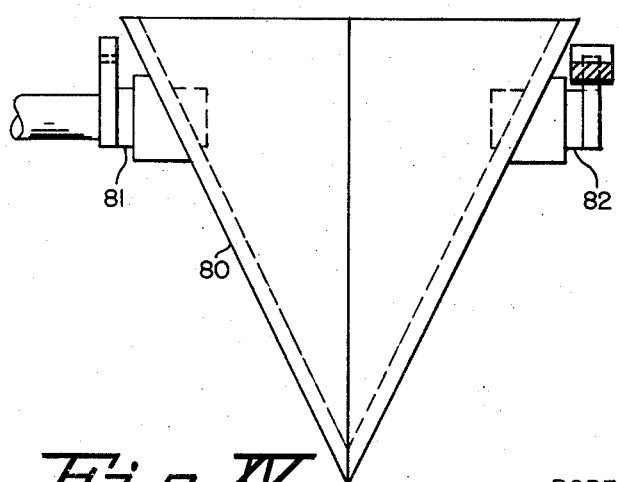
Fig. XV
INVENTORS
ROBERT M. CARRIER, JR.
JOHN M. MORRIS
BY
Marshall, Marshall & Yeasting
ATTORNEYS

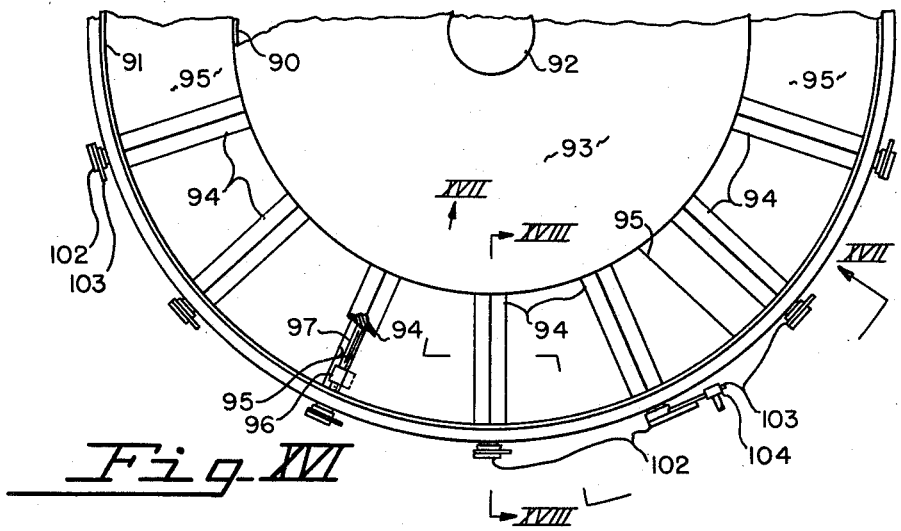
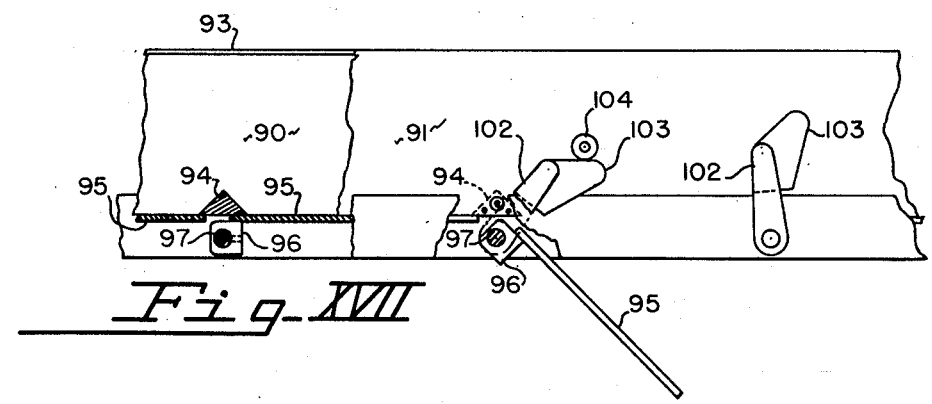
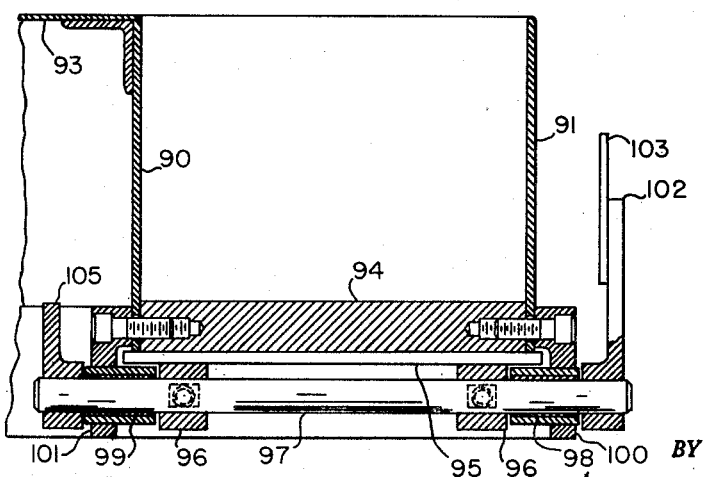

3,112,000
APPARATUS FOR CONTINUOUSLY WEIGHING AGGREGATE
John M. Morris and Robert M. Carrier, Jr., Louisville, Ky., assignors, by mesne assignments, to Chain Belt Company, Milwaukee, Wis., a corporation of Wisconsin
Filed Sept. 18, 1959, Ser. No. 841,433
9 Claims. (Cl. 177—54)

This invention relates to conveying equipment employed with continuous weighing apparatus and more particularly to improvements in the conveying equipment to enable it to handle various types of materials that cannot be satisfactorily handled on ordinary weighing equipment.

Continuous weighing equipment ordinarily comprises a flexible belt at least a portion of which is supported on a weighing scale and which belt is operated at a constant or a known speed so that the weight indicated by the scale and the travel of the belt is a measure of the quantity of material transported. While such belts can handle many different kinds of material they are unsatisfactory for use with some materials such as the hot product from a sintering furnace or with hot clinkers.

The principal object of this invention is to provide a continous weighing apparatus suitable for handling hot materials and other materials that would damage an ordinary flexible belt used in ordinary weighing conveyors.

Another object of the invention is to provide a load weighing conveyor mechanism that operates in a generally horizontal path and in which the material is loaded onto and removed from the conveyor mechanism at points approximately in the same vertical plane as the pivot axis of the lever supporting the conveyor mechanism.

A still further object of the invention is to provide a generally circular conveyor the material supporting portion of which is comprised of a series of individual elements which collectively form a continuous surface and in which each of the elements is tippable to discharge the load of material thereon.

A still further object of the invention is to provide a weighable conveyor for conveying material in a substantially circular path in which the conveying mechanism comprises a plurality of open topped receptacles that collectively form a continuous series of pockets which are individually tippable to discharge their contents.

These and more specific objects and advantages are obtained in a weighable conveyor constructed according to the invention.

According to the invention the improved conveying and weighing apparatus includes a conveyor supported on a weighing scale lever the conveyor comprising a plurality of individual elements arranged in a generally circular array and bodily moved in a circle the center of which is offset from a vertical plane through the pivot axis of the supporting lever. The offset is such that the vertical plane through the supporting lever fulcrum pivots is approximately tangent to the radially inner portions of the material supporting surfaces of the conveyor. The invention further contemplates loading material onto the conveyor at a point that is substantially in the vertical plane through the fulcrum pivot axis of the lever and for discharging material from another point in the circular array which is also in the same vertical plane.

Several embodiments of the invention are illustrated in the accompanying drawings.

In the drawings:

FIG. I is a generally schematic plan view illustrating the arrangement of the conveyor on the weighing scale lever with respect to the fulcrum axis of the lever and the load counter-balancing mechanism.

FIG. II is a side elevation of the improved conveyor system shown in FIG. I.

FIG. III is a perspective view of the circular array of conveyor elements showing the general arrangement of the loading and discharge chutes in relation to the path of the material carrying elements.

FIG. IV is a detailed view of the support and a portion of the drive for the array of elements.

FIG. V is a fragmentary side elevation of a portion of the conveyor assembly to illustrate the means for discharging material from the conveyor.

FIG. VI is a fragmentary vertical section of a portion of the conveyor structure as seen from the line VI—VI of FIG. VII.

FIG. VII is a fragmentary plan view of a portion of the conveyor mechanism illustrating the general arrangement of the parts making up one material carrying element of the system.

FIG. VIII is a perspective view of another arrangement of buckets for the improved conveyor.

FIG. IX is a fragmentary detail indicating the tripping or dumping arrangement for one of the buckets.

FIG. X is a further fragmentary detail showing the cooperation of the tripping roller of a cam and trip arms of the individual conveyor elements to effect discharge of the material.

FIG. XI is a fragmentary detail showing the means for returning the conveyor elements to load receiving position.

FIG. XII is a fragmentary plan view of another form of bucket for the conveyor array.

FIG. XIII is an end elevation of one of the buckets shown in FIG. XII showing the cooperation between the buckets to provide a substantially continuous material receiving structure.

FIG. XIV is a plan view of still another form of bucket suitable for use in the apparatus.

FIG. XV is a section taken along the line XV—XV through the bucket shown in FIG. XIV.

FIG. XVI is a fragmentary plan view of another form of rotary conveyor suitable for continuous weighing of conveyable materials.

FIG. XVII is a fragmentary elevation partially in section as seen from the line XVII—XVII in FIG. XVI.

FIG. XVIII is an enlarged vertical section as seen from the line XVIII—XVIII of FIG. XVI.

These specific figures and the accompanying description are intended merely to illustrate the invention and not to impose limitations on its scope.

Continuous weighers may take several forms depending upon the material to be handled, the amount of space available, and the accuracy required. One common form of continuous weigher is a conveyor belt having a section running over rollers supported on a weighing scale. In some cases the entire belt conveyor is supported on the weighing scale. The accuracy of such a system is dependent upon the travel of the conveyor belt, which ordinarily can be measured quite accurately, the weighing scale accuracy, and upon the exact length of time or portion of the cycle during which an individual particle of the material is carried on the weighed portion of the conveyor. When the entire conveyor belt is carried on the weighing scale the time that the material is on the belt is still a factor because there are unavoidable variations in the point of loading of the material onto the belt and in the angle of repose of the material as it falls over the discharge end of the conveyor. One of these latter errors can be materially reduced by arranging the conveyor so that only one end of the frame supporting the belt is carried on the scale and so that the material is loaded or discharged over the fulcrum end of the frame. In such an arrangement small variations in the point of loading or discharge have little effect on the weight indication.

To provide a conveyor capable of handling hot material and still be of a form that may be conveniently weighed, the conveyor according to one form of the invention, is constructed in the form of a circular rotatable trough 10 carried on spokes 11 from a hub 12. The bottom of the trough 10 is formed of a series of trap doors 13 each of which slightly overlaps its neighbor and each of which, as may be seen in FIGS. V, VI, and VII, is carried on an axis and equipped with an arm 14 arranged to engage a cam track 15 for tipping the trap door to discharge its material into the discharge chute 16 as the circular trough is rotated. For constructional convenience the sides of the circular trough are made polygonal rather than precisely circular so as to conform to the outline of the individual trap doors and permit tipping of the trap doors without interference between the sides of the trap doors and the side walls of the trough.

The circular trough 10 is rotatably mounted on one end of a weighing scale lever 20 which is fulcrumed on bearings 21 in a stand 22. The lever 20 also supports a drive motor 23 which is connected through a chain 24 or other suitable power transmission means to a vertical drive shaft 25 (FIG. IV) supporting the hub 12 and the trough 10.

Preferably the motor 23 is positioned along the length of the lever 20 so as to counterbalance the greater portion of the weight of the generally circular trough conveyor 10. Also the vertical position of the motor 23 relative to the pivot bearings 21 is adjusted so that the assembly of the lever 20, the conveyor 10 and the motor 23 has its center of gravity substantially on the same level as the bearings 21.

A load counterbalancing mechanism comprising a weighbeam 26 carried on a fulcrum stand 27 and connected to the lever 20 through a steelyard rod 28 and suitable bearings is equipped with a poise 29 for indicating and counterbalancing the load forces applied to the lever 20 by material in the circular trough 10.

If it is desired to feed a constant quantity of material per unit of time a feeder 30 may be arranged to feed material through a chute 31 onto the rotary conveyor 10 and the rate of feed of the feeder 30 may be controlled by a detecting and control mechanism 33 coupled to the end of the weighbeam 26 and serving to regulate the amplitude of vibration of the conveyor 30.

If instead of attempting to maintain a constant rate of feed it is desired merely to measure the quantity of material being transmitted the weighbeam 26 may be connected to an automatic load counterbalancing mechanism which in turn is connected to an integrating mechanism for integrating the load indications with respect to time or with respect to rotation of the conveyor 10. Such integrating mechanisms and automatic load counterbalancing mechanisms are well known in the art.

The general arrangement of the rotary conveyor 10, the cam track 15 and the chutes 16 and 31 are shown in FIG. III. As indicated in this figure, each of the trap door sections 13 forming the bottom of the trough 10 is provided with an arm 14 mounted on a trunnion of the trap door and located just outside the outer wall of the conveyor trough 10. These arms 14 extend forwardly and upwardly when the trap doors are in load receiving position and when they engage a roller 36 at the leading end of the cam 15 (FIGURE V) they tip the trap doors 13 clockwise as seen in FIG. III so as to dislodge any material on the trap door and permit it to fall into the discharge chute 16. The trap doors are held in the tipped position as long as the arms follow along the underside of the cam 15. As the arms 14 pass the end of the cam 15 the trap doors are returned to their level position by return springs 37, one for each trap door, that are connected between the flange-like spokes 11 of the conveyor wheel and arms 38 mounted on inner trunnions 39 of the trap doors. These springs serve to keep the trap doors in horizontal alignment as the wheel is turned past the loading position and around to the discharge position.

As may be seen in FIGS. III and VI, each of the trap doors 13 comprises a bottom plate 13a and a pair of generally semi-circular end plates 40 and 41. Likewise, the walls of the trough 10 are provided with matching plates 42 and 43 as a deterrent to the sifting of material into the space between the semi-circular end plates 40 and 41 and the adjacent walls of the conveyor trough. The trunnion 39 and a similar trunnion 44 at the radially outer side of the trap door are formed as square shouldered bolts that fit into square holes in the end plates 40 and 41 and are journaled in the side walls of the trough with the arms 14 and 38 secured on their outer ends.

Each of the trap doors 13 along its leading edge has a narrow lip 45 that overlies the adjacent edge of the next previous trap door. The spring urged movement of the trap doors 13 is limited by contact between the trap doors and a plurality of support bars 46 that extend from the radially inner wall of the circular conveyor 10 to the outer wall and serves as the support for the outer wall.

As may be seen in FIG. VII, the lip 45 of each of the trap doors 13 is positioned with respect to the edge of the trap door so as to operate within the space between the sides of the conveyor trough adjacent that particular trap door rather than extending into the next section which would require special shapes in the side walls to permit the tipping movement of the trap door.

The support for the assembly of the conveyor wheel 10 including its hub 12 is indicated in considerable detail in FIG. IV. As shown in this figure, a central stationary support tube 48 mounted in the lever 20 extends upwardly from the lever and carries a pair of ball bearings 49 and 50 which journal the drive shaft 25. The upper end of the shaft 25 carries the hub 12, which is in the form of a downwardly opening cup-shaped cylindrical member securely attached to the shaft 25. This provides a simple, easily constructed mount for accurately carrying the conveyor trough during its rotation.

FIGS. VIII, IX, X and XI illustrate another form of rotary conveyor suitable for use as a continuous weigher. As indicated in FIG. VIII, the assembly of this form of rotary conveyor comprises a central hub 51 from which a number of radial spokes 52 extend. The spokes 52 carry, intermediate their ends, a first polygonal drum 53 having one side for each of a plurality of buckets 54 forming the conveyor and a second polygonal member 55 carried on the outer ends of the spokes 52. Each of the buckets 54 comprises a receptacle portion 56 and a shaft 57. The shaft 57, corresponding to the handle of a ladle, is journaled in the polygonal members 55 and 53 for rotation about its own axis to empty the associated bucket 54. Each of the buckets 54 on its outer wall carries an arm 58 that is arranged to cooperate with a cam track 59 that includes a roller 60 on its forward end. Springs 61, appearing in FIG. XI only, connected to arms 62 on the shafts 57 urge the buckets 54 to upright position for receiving load.

The tipping action of the buckets as they pass the cam track 59 which is generally the same as that previously described is shown in detail in FIG. X. The bucket to the right in this figure is in its upright load carrying position and, as it moves to the left, the tip of its arm 58 engages the roller 60. Because the axis of its shaft 57 passes beneath the level of the roller 60 the forward motion of the array of buckets causes the arm 58 and bucket 54 to rotate clockwise as the arm 58 passes beneath the roller 60 and follows along the underside of the cam track 59. This rotates the bucket 54 substantially more than 90° so that it is quickly turned to load discharge position as it passes the roller 60.

As may be seen in FIG. IX, each of the buckets 54 on its leading edge has a lip 63 that overlaps the rim of the next bucket. This is to prevent any loss of material through the spaces between the buckets as they pass beneath the loading chute.

For some materials this particular conveyor arrangement is preferable to the trough and trap door system illustrated as the first embodiment because there are no closely-adjacent, relatively-moving surfaces exposed to contamination from the material being handled. The essential difference is that this second form comprises a plurality of individual buckets that are supported on shafts journaled in the wheel remote from their material handling portions.

FIGS. XII and XIII illustrate another form of bucket that is suitable for use in a conveyor assembly similar to that shown in FIGS. I, II, III and IV. In this arrangement each bucket is in the form of a shallow bowl-shaped casting having parallel end walls 65 and 66 fitted with trunnions 67 and 68 that are carried in bearings 69 and 70 in side walls 71 and 72 of a rotary wheel assembly such as the trough 10 in FIG. I. An arm 73 attached to the trunnion 68 is arranged to tip the bucket to discharging position as it cooperates with a cam track while a second arm 74 and spring 75 serve to return the bucket to upright position as soon as the arm 73 passes the end of the cam track. The leading edge of the bucket is formed with a lip 76 adapted to overlie a stop and support rod 77 that ties the walls 71 and 72 together. The trailing side of the bucket is formed with a slightly concave edge 78 adapted to abut the lower side of the next following support rod. In this arrangement the buckets, when in load receiving position as illustrated, form a substantially continuous surface from bucket to bucket for the reception of material and, if the loading chute is narrower than the axial length of the buckets, there is little chance for spilling of material over the sides of the buckets.

In each of the foregoing embodiments the radial distance of the load in the buckets or in the trough from the center of rotation of the conveyor may vary depending upon the amount of load in the conveyor and the position of the loading chute. Thus, the load may be banked against one or the other of the side walls of the trough 10 or may be concentrated toward one end of the buckets 56 or against a side wall 65 or 66 of the bucket shown in FIG. XII. Since variations of the radial distance of the load from the center of rotation cause corresponding differences in the moment arm of the increments of load as they are carried around on the conveyor it follows that any variations in the radial positioning of the load will cause corresponding variations in the indicated load. In these various types of conveyors, for the best accuracy, the loading chute should be arranged to deposit the material as near the center line between the radially inner and outer walls of the trough as is possible. When the material is so deposited it makes little difference in the accuracy of measurement how much material is in the conveyor since its center of gravity will remain at about the same radius.

If greater accuracy is required the design of the bucket may be changed to that illustrated in FIGS. XIV and XV. In this embodiment a bucket 80 which is carried on a pair of trunnions 81 and 82, in the same manner as the trap doors of FIG. I, is formed with sloping side walls that meet in a sharp bottom line 83 that is parallel to the path of the buckets 80. This sharp bottom line is preferably midway between the radially inner and outer edges of the top of the bucket so that the material being fed into the bucket, particularly at light loads, will take a position at a constant radius from the center of rotation. As the rate of loading increases the center of gravity of the individual loads still remains at substantially the same distance from the center of rotation regardless of quantity and therefore minimizes any calibration factors dependent upon the location of the material being carried.

Another form of rotary conveyor suitable for the continuous weighing of aggregates and designed for easy commercial production is illustrated in FIGS. XVI, XVII and XVIII. In this form a rotating turntable serving as a conveyor includes a pair of spaced circular upstanding sidewalls 90 and 91 with the radially inner sidewall 90 suitably supported from a central hub 92 by means of spokes, not shown. A cover plate 93 extends from the hub 92 radially outward to just overlie the top of the inner circular sidewall 90.

The outer sidewall 91 is supported in spaced relation to the inner side wall by means of a plurality of spoke-like spacers 94. Each of the spacers 94 in vertical cross section, is an isosceles right triangle with the right angle pointed upwardly and with the hypotenuse side of the triangle located coplanar with the bottom edges of the side walls 90 and 91. As illustrated the spacers 94 are located twenty-four degrees apart so that fifteen are required in the turntable.

The sidewalls 90 and 91 form the sides of the trough, the bottom of which is composed of a number of trap doors 95 each of which is of a size and shape such that when it is in position its marginal edge underlies the sidewalls 90 and 91 and a portion of each of the adjacent spacers 94. Since the bottom surface of each of the spacers 94 is coplanar with the bottom edges of the sidewalls 90 and 91 the trap doors 95 can be perfectly flat and still form a tight seal with both the sidewalls and the spacers. Thus the combination of the spacers 94 and trap doors form a complete bottom for the trough extending around the turntable.

Each of the trap doors 95 is provided with a pair of lugs 96 welded under one radial edge and extending beyond such edge. Each of the trap doors is, by means of the lugs 96 mounted on a control shaft 97 journaled in bearings 98 and 99 mounted in rings 100 and 101 that are respectively outside the sidewall 91 and inside the sidewall 90. The rings are attached by screws passing through the sidewalls 90 and 91 into the ends of the spacers. The rings 100 and 101 extend below the level of the sidewalls to position the shafts 97 so that the trap doors may swing from a trough closing position, as illustrated in the left portion of FIG. XVII, to a discharging position as indicated near the central portion of FIG. XVII. To accomplish this the shafts 97 are located directly beneath the center line of the adjacent spacer 94.

Each of the trap door control shafts 97, at its outer end, is provided with a radially extending arm 102 provided with a cam plate 103 which, as is illustrated in FIG. XVII, engages a roller 104 which serves to deflect the trap door to its open position as the arm passes the roller 104.

Each of the trap door shafts 97 on its inner end is provided with an arm 105, similar to the arm 38 shown in FIGS. VI and VII, which is engaged by a spring, not shown, adapted to return the trap door to its trough closing position and hold it in such position.

This particular style of trap door functions in the same manner as the trap doors illustrated in the assemblies shown in FIGS. I through VII inclusive but offers the improvement of simplified design that facilitates the manufacture of the assembly. Thus whereas the assemblies shown in FIGS. I through VII include many parts operating in closely spaced relation and subject to contamination by the materials being handled the assembly shown in FIGS. XVI to XVIII inclusive is arranged so that none of the parts operating in close conjunction or close relation to other parts are exposed to the material being conveyed and that all of the sealing joints between various movable members required to confine the material are in a single plane.

In each of the foregoing arrangements and particularly as seen in FIGS. I and II, the loading chute is arranged to lead the material onto the rotating conveyor assembly at a point which is substantially in a vertical plane passing through the fulcrum bearings 21 of the lever 20 carrying the conveyor assembly. When the material is loaded at this point the shock of the falling material into the conveyor or variations in the timing or exact position where the material falls into the conveyor has little or no effect on the scale inasmuch as it is directly over the fulcrum axis. Likewise, the trap doors 13 or the individual buckets are tripped to discharging position as they pass over the fulcrum axis of the lever so that again the moment arm of the increment of load is a minimum during the transfer of load.

In each of the various arrangements the material contacting portions of the conveyor are constructed of metal that need not bend or flex in operation and therefore can be made as heat resistant and rugged as necessary to handle any materials. Furthermore, since some of the embodiments contain a plurality of buckets which can be made liquid tight it is also possible to use this conveyor arrangement for metering liquid materials or slurries or other mixtures of liquid and solid material. The only requirement of limitation is that the material shall not adhere to and accumulate on the surfaces of the buckets or trap doors.

Various modifications in the detailed construction of the circular array of load carrying elements forming the weighing conveyor may be made without departing from the spirit and scope of the invention.

This is a continuation-in-part of our application Serial No. 764,078, filed September 29, 1958, now abandoned.

Having described the invention, we claim:

1. In a device for weighing material in transit, in combination, a generally horizontal lever, a fulcrum stand for supporting the lever, a wheel mounted on the lever for rotation about a generally vertical axis that is offset horizontally from the fulcrum axis of the lever, means for rotating the wheel, a plurality of tippable material supporting elements mounted on the periphery of said wheel at a radius to pass through a vertical plane including the fulcrum axis of the lever, means for loading material onto said elements as they pass the fulcrum axis toward that end of the lever supporting the wheel, means for tipping the elements to discharge the material thereon as they closely approach the fulcrum axis, and means for counterbalancing and indicating the load imposed on the lever by the weight of material on said tippable elements.

2. In a device for weighing material in transit, in combination, a series of tippable material supporting elements arranged in a generally horizontal circular array, a horizontal lever mounted for pivotal movement about a horizontal fulcrum axis, means fixed on the lever for mounting and rotating said array about a vertical axis that is offset laterally from said fulcrum axis, means for loading material onto said array at a point nearer said fulcrum axis than said vertical axis, means for tipping each of said elements after at least a half revolution of the array to discharge material thereon as it reaches a point adjacent the fulcrum axis, and means for counterbalancing and indicating the load imposed on said lever by the material on said array of elements.

3. In a device for weighing material in transit, in combination, a series of tippable material supporting elements arranged in a generally horizontal circular array, a pivotally mounted lever, means for supporting the array of elements on said lever and rotating the array around a vertical axis offset from the pivot axis of the lever such that the pivot axis is generally tangent to the path of the elements, means for loading said elements as they pass along the pivot axis, means for tipping the elements to discharge the material as they closely approach the pivot axis, and means for counterbalancing and indicating the load imposed on the lever by the material on said array of elements.

4. In a device for weighing material in transit, in combination, a series of tippable material supporting buckets arranged in a circular array with a radially extending lip of each overlying a rim of an adjacent bucket, a pivotally mounted lever, means fixed on the lever for supporting the buckets for rotation about a vertical axis offset from the pivot axis of the lever, means for loading material into the buckets as they pass near the pivot axis of the lever, means for tipping the buckets to discharge material as they next pass the pivot axis, and means for counterbalancing and indicating the load imposed on the lever by the material in the buckets.

5. In a device for weighing material in transit, in combination, a series of tippable material supporting buckets arranged in a generally horizontal circular array, a pivotally mounted lever having a fulcrum axis, means for mounting the array of buckets on the lever for rotation about a vertical axis offset from the fulcrum axis, said buckets cooperating to form a substantially unbroken annulus for the reception of material in a continuous flow as the buckets pass near the fulcrum axis of the lever, means for individually tipping the buckets to discharge the material therein as they closely approach the fulcrum axis, and means for counterbalancing and indicating the load imposed on the lever by the weight of material in the buckets.

6. In a device for weighing material in transit, in combination, a series of tippable material conveying receptacles arranged in a generally horizontal circular array, a pivotally mounted lever, means for mounting said array of receptacles on said lever for rotation about a vertical axis that is offset from the axis of the lever, a motor mounted on the lever for driving the array of receptacles, means for loading material into the receptacles as they pass the axis of the lever in the direction of the offset of said vertical axis, means for tipping the receptacles to discharge material as they next pass the pivot axis of the lever, and means for counterbalancing and indicating the load imposed on the lever by the weight of the material in the receptacles.

7. In a device for weighing material in transit, in combination, a series of tippable material conveying receptacles arranged in a generally horizontal circular array, each of said receptacles having a V-bottom extending circumferentially of the circular array, a pivotally mounted lever, means for mounting the array of receptacles on the lever for rotation about a vertical axis offset from the pivot axis of the lever, means for rotating the array of receptacles, means for loading material into the receptacles as they pass the pivot axis of the lever, said means being aligned with the V-bottom of the receptacles receiving the material whereby the receptacle is loaded symmetrically, means for tipping the receptacles to discharge material therefrom as they closely approach the pivot axis, and means for counterbalancing and indicating the load imposed on the lever by the weight of material in the receptacles.

8. In a device for weighing material in transit, in combination, a series of tippable material conveying elements arranged in a generally horizontal circular array, a pivotally mounted lever, means for mounting said array from said lever for rotation about a vertical axis offset from the pivot axis of the lever, said means including a frame journaled on a vertical axis, said frame having a pair of radially spaced circumferentially extending walls defining an annular channel of which said elements form the bottom, means for loading material onto said array of elements as they pass adjacent the pivot axis of the lever, means for tipping the elements as they pass the pivot axis immediately before loading for discharging previously loaded material, and means for counterbalancing and indicating the load force applied to the lever by material on the elements.

9. An apparatus according to claim 8 in which the circumferentially extending walls are circular and are spaced by spacers having flat bottoms coplanar with the bottoms of the walls and in which the tippable elements abut the bottoms of the walls and spacers.

References Cited in the file of this patent

UNITED STATES PATENTS

| | | |
|---|---|---|
| 720,008 | Doble | Feb. 10, 1903 |
| 760,524 | Crossley | May 24, 1904 |
| 766,234 | Fidell | Aug. 2, 1904 |
| 1,717,564 | Ihlefeldt | June 18, 1929 |
| 2,600,966 | Carrier | June 17, 1952 |
| 2,619,256 | Wiley | Nov. 25, 1952 |
| 2,652,141 | Gilmore | Sept. 15, 1953 |